United States Patent
Ross, Jr. et al.

(10) Patent No.: US 7,109,857 B2
(45) Date of Patent: Sep. 19, 2006

(54) BRAKE LIGHT WARNING SYSTEM FOR SAFETY HELMETS AND METHOD OF OPERATION

(76) Inventors: Herbert G. Ross, Jr., 140 Fawn Hollow Dr., Argyle, TX (US) 76226; Bud Wilcox, 13395 Bass Trail, Grass Valley, CA (US) 95945

( * ) Notice: Subject to any disclaimer, the term of this patent is extended or adjusted under 35 U.S.C. 154(b) by 144 days.

(21) Appl. No.: 10/891,909

(22) Filed: Jul. 15, 2004

(65) Prior Publication Data

US 2006/0012471 A1   Jan. 19, 2006

(51) Int. Cl.
*B60Q 1/44* (2006.01)
(52) U.S. Cl. ............ 340/479; 340/468; 340/436; 180/244; 180/247; 188/71.1; 188/73.37; 200/61.89
(58) Field of Classification Search ............ 340/479, 340/468, 463, 467, 464, 432, 472, 436; 180/244, 180/247; 188/71.1, 73.31, 73.37; 200/61.89
See application file for complete search history.

(56) References Cited

U.S. PATENT DOCUMENTS

| | | | |
|---|---|---|---|
| 4,559,516 A | 12/1985 | Schott et al. | |
| 4,760,373 A * | 7/1988 | Reilly | ............ 340/432 |
| 4,769,629 A | 9/1988 | Tigwell | |
| 4,823,109 A * | 4/1989 | Boyer | ............ 340/467 |
| 4,862,331 A | 8/1989 | Hanabusa | |
| 4,891,736 A | 1/1990 | Gouda | |
| 4,901,210 A | 2/1990 | Hanabusa | |
| 4,956,752 A * | 9/1990 | Foglietti | ............ 362/473 |
| 5,040,099 A | 8/1991 | Harris | |
| 5,353,008 A * | 10/1994 | Eikenberry et al. | ......... 340/479 |
| 5,477,209 A | 12/1995 | Benson, Jr. et al. | |
| 5,704,707 A | 1/1998 | Gebelein et al. | |
| 5,910,764 A * | 6/1999 | Hayden | ............ 340/479 |
| 6,406,168 B1 | 6/2002 | Whiting | |
| 6,529,126 B1 | 3/2003 | Henry | |
| 6,784,795 B1 * | 8/2004 | Pories et al. | ............ 340/479 |

* cited by examiner

*Primary Examiner*—Thomas Mullen
*Assistant Examiner*—Daniel Previl
(74) *Attorney, Agent, or Firm*—Alvin R. Wirthlin

(57) ABSTRACT

A brake light warning system for safety helmets includes a transmitter module adapted for mounting to a vehicle, such as a motorcycle, and a receiver module adapted for mounting to a safety helmet. The transmitter module is configured to continuously transmit a transmission signal when a brake of the vehicle is disengaged and discontinue transmission of the transmission signal when a brake of the vehicle is engaged. The receiver module is configured to detect a presence or absence of the transmission signal from the transmitter module. The receiver module has at least one light generating element that illuminates or increases in brightness upon detection of the absence of the transmission signal to indicate that the vehicle brake is engaged.

20 Claims, 4 Drawing Sheets

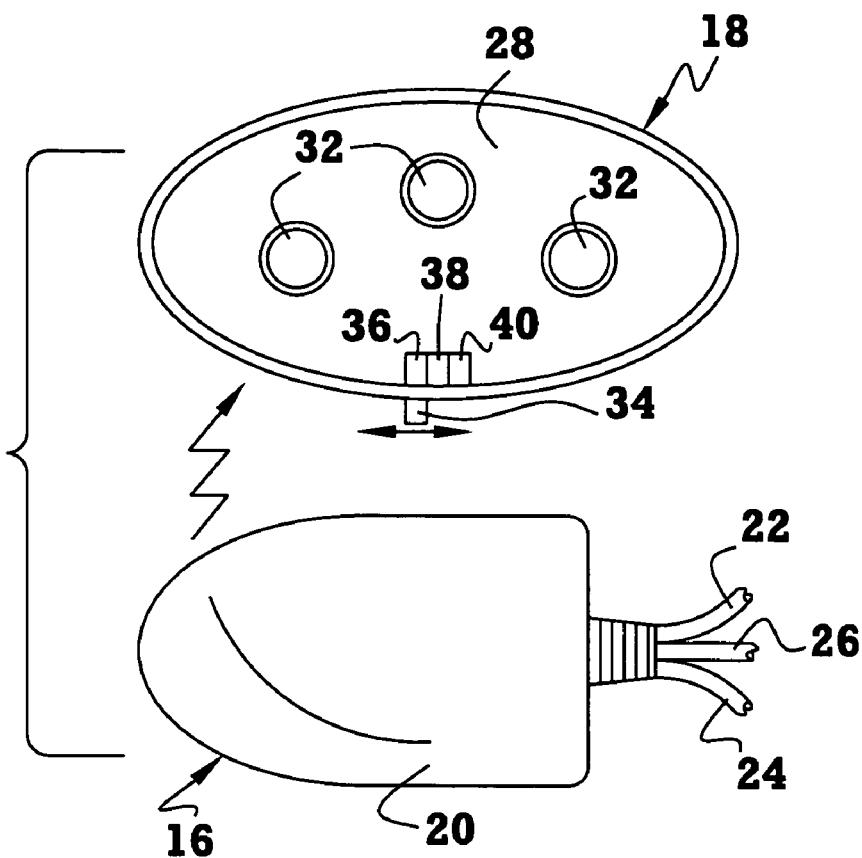
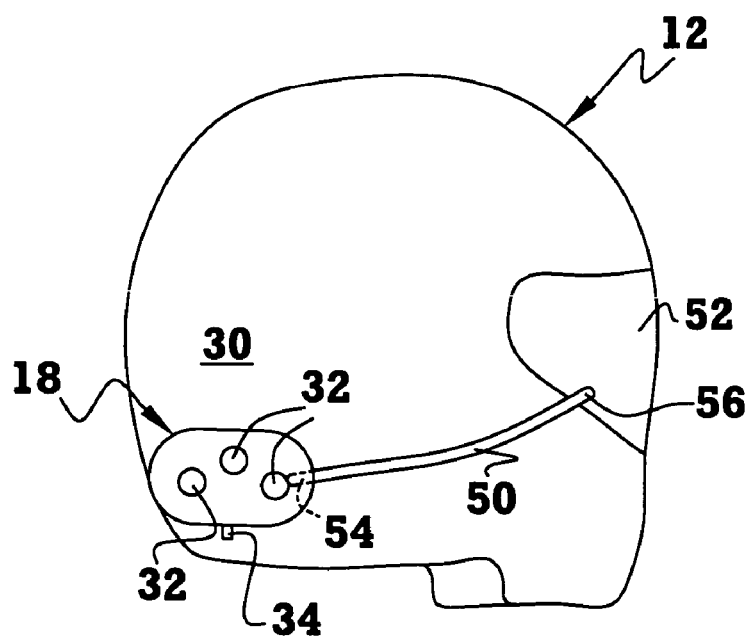

BRAKE LIGHT WARNING SYSTEM FOR SAFETY HELMETS AND METHOD OF OPERATION

BACKGROUND OF THE INVENTION

This invention relates to safety or warning lights, and more particularly to a rear mounted helmet safety light that is actuable to emit a warning signal when an associated vehicle event occurs, such as operation of the vehicle or actuation of a vehicle brake.

It has long been recognized that the provision of an auxiliary center high mounted stop light (CHMSL) in motor vehicles has decreased the number of rear-end collisions and related injuries. Typically, the CHMSL is positioned at or near the rear window at approximately eye level, and can thus more readily be observed by the operator of a trailing vehicle. Although motorcycles or other two-wheeled vehicles could benefit from a CHMSL, in many instances it would be difficult, impractical and unsightly to mount the auxiliary stop light at eye level.

In an effort to overcome this problem, several helmet-mounted stop lights have been proposed. One such system is disclosed in U.S. Pat. No. 4,760,373 issued to Reilly wherein a rearward-facing warning light is mounted on the back of a motorcycle helmet. A transmitter is attached to the motorcycle and a receiver for activating the light is mounted inside the helmet. When the brake pedal is depressed, the transmitter transmits a coded signal to the receiver, which in turn decodes the signal and illuminates the light until the brake pedal is released, at which time the transmitter ceases to transmit. However, since the light of such systems is typically illuminated only when the signal is transmitted to the receiver, no illumination will occur in the event of a transmitter or receiver malfunction. Consequently, an operator of a trailing vehicle may not be readily aware of the motorcycle braking action.

In addition, since the safety light is mounted at the rear of the helmet, it is not possible for the motorcycle operator or rider to determine if the light is operating properly. Accordingly, it would be desirous to provide means for alerting the operator or rider of the illuminated or non-illuminated state of the helmet light.

BRIEF SUMMARY OF THE INVENTION

According to one aspect of the invention, a brake light warning system for safety helmets comprises a transmitter module adapted for mounting to a vehicle and a receiver module adapted for mounting to a safety helmet. The transmitter module is configured to continuously transmit a transmission signal when a brake of the vehicle is disengaged and discontinue transmission of the transmission signal when a brake of the vehicle is engaged. The receiver module is configured to detect a presence or absence of the transmission signal from the transmitter module. The receiver module has at least one light generating element that illuminates or increases in brightness upon detection of the absence of the transmission signal to thereby indicate that the vehicle brake is engaged.

According to a further aspect of the invention, a brake light warning system for safety helmets comprises a transmitter module adapted for mounting to a vehicle and a receiver module adapted for mounting to a safety helmet. The transmitter module is configured to detect a vehicle brake state while the receiver module is configured to detect a transmission from the transmitter module. The receiver module includes at least one light generating element that illuminates or increases in brightness upon a change of the vehicle brake state. An indicator is operably connected to the receiver module for remotely viewing operation of the at least one light emitting element.

According to an even further aspect of the invention, a method of operating an auxiliary safety brake light for a vehicle comprises monitoring whether a vehicle's brake is engaged or disengaged, continuously transmitting a signal when the brake is disengaged, discontinuing signal transmission when the brake is engaged, detecting a presence or absence of the signal, and modifying a state of an auxiliary safety brake light when the transmitted signal is not present to thereby indicate that the brake is engaged.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein:

FIG. 2 is a front elevational view of transmitter and receiver modules that form part of the brake light warning system of the present invention;

FIG. 3 is a perspective view of a safety helmet and receiver module with an indicator for remotely viewing operation of the receiver module;

It is noted that the drawings are intended to depict only typical embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Figure 1:
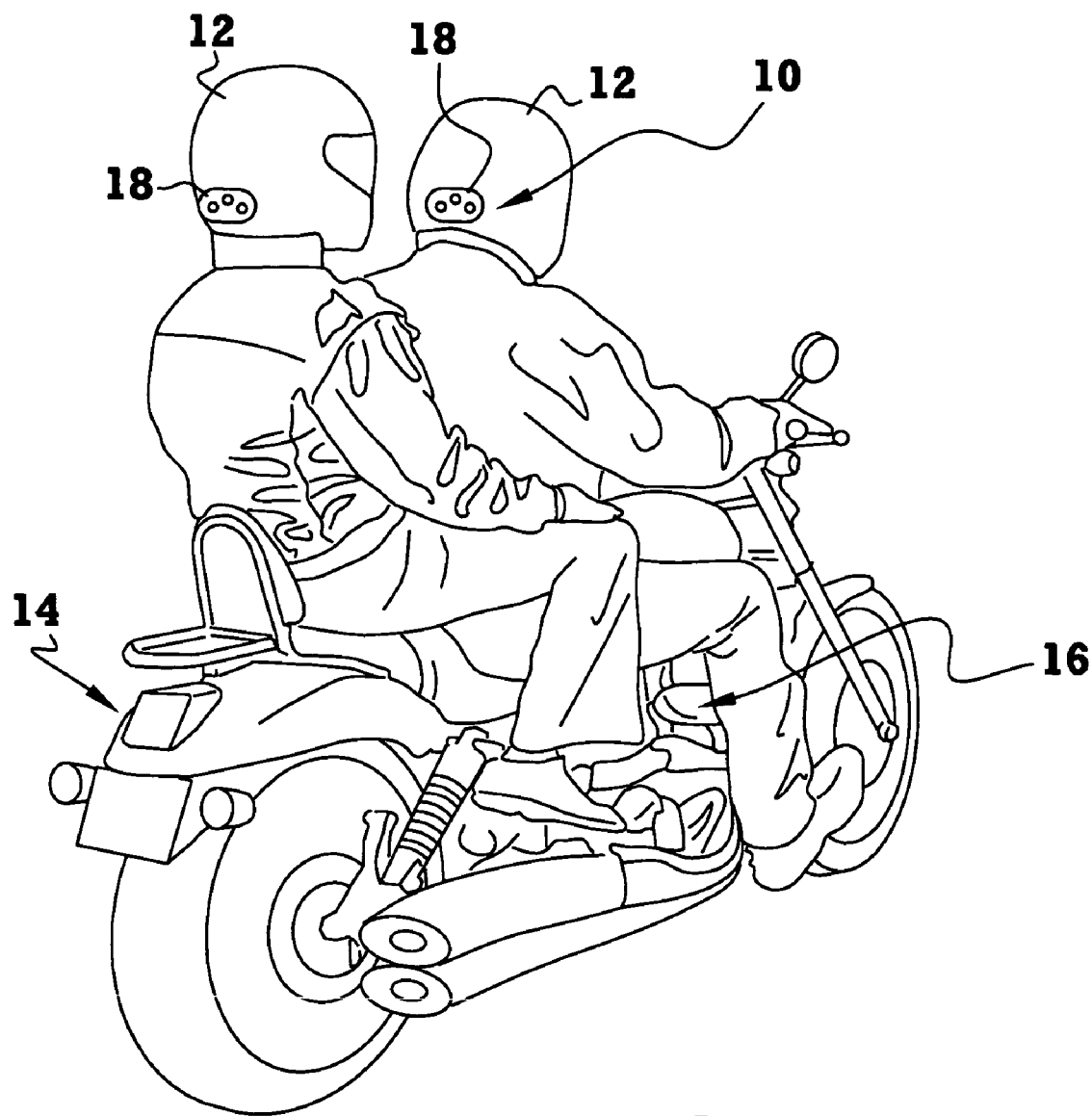
FIG. 1 is a perspective view of a brake light warning system in accordance with the present invention for use in conjunction with one or more safety helmets and a motorcycle.

Referring to the drawings and to FIG. 1 in particular, a brake light warning system 10 in accordance with the present invention for use in conjunction with one or more safety helmets 12 and a motorcycle 14 or other vehicle is illustrated. The brake light warning system 10 comprises a transmitter module 16 adapted for mounting to the motorcycle 14 and a receiver module 18 adapted for mounting to one or more of the safety helmets 12. Preferably, the transmitter module 16 and receiver module 18 are wireless devices.

With reference to FIG. 2, the transmitter module 16 includes a housing 20 that can be mounted at any convenient location on the motorcycle chassis and is electrically connected to the vehicle power, ground, and brake light circuit via wires 22, 24, and 26, respectively, that extend out of the housing 20. In operation, the transmitter module emits a continuous RF signal when the motorcycle's running lights are on and the motorcycle's brake light circuit is disengaged. When the brake light circuit is engaged, such as by depressing a brake lever, the RF signal is interrupted. This feature is different from prior art arrangements where the signal is transmitted only if the motorcycle's brake light circuit is engaged. If desired, that transmitter module 16 may include an on/off switch (not shown). In the "on" position, the transmitter module 16 operates as described above. In the "off" position, the transmitter module 16 does not emit a signal regardless of the position of the brake pedal. The particular arrangement and operation of the transmitter module 16 will be described in greater detail below.

The transmitter module housing 20 may be of any desired shape and material and may be provided with any suitable mounting means (not shown), such as openings for mechanical fasteners, clamps, adhesive strips, magnets, cooperating hook and loop material on the motorcycle 14 and housing 20, or other cooperating or interconnecting structure.

The receiver module 18 includes a housing 28 that is preferably adhesively secured to the rear portion 30 of the helmet 12, but may be provided with any suitable mounting means (not shown), such as openings for mechanical fasteners, clamps, adhesive strips, magnets, cooperating hook and loop material on the helmet 12 and housing 28, or other cooperating structure. Preferably, the receiver module 18 is completely self-contained with its own power source, and therefore does not require vehicle power. Light generating elements 32 are arranged to project light outside and rearward of the receiver module housing 28 and may be illuminated, brightened, dimmed, or extinguished at different vehicle operational events, such as at vehicle start-up, shutdown, or brake actuation, as will be described in greater detail below. The light generating elements 32 are preferably in the form of high or super bright light emitting diodes (LED's) due to their high visibility, longevity, and low power requirements. However, it is understood that other light generating elements, such as incandescent bulbs, can be used. Although three lights are shown, it will be appreciated that more or less lights may be provided.

A three-position slide switch 34 is preferably provided on the receiver module 18 for manually selecting between an "off" position 36 and one of two operating modes or positions 38, 40. When the switch 34 is in the "off" position, the RF receiver circuit is disengaged from its power supply and the light generating elements 32 are off. The "off" position thus serves to conserve battery power when not in use. In addition, the "off" position can be selected by a motorcycle operator when carrying a passenger to prevent the light generating elements from shining into the passenger's eyes. Under these circumstances, the passenger's helmet may also carry a receiver module 12, as shown in FIG. 1, to operate in one of the two selectable operating modes.

When the switch 34 is in the first operating mode or position 38, one or more of the light generating elements 32 serve as running lights by continuously emitting light at a reduced intensity until the RF signal from the transmitter module 16 is lost, such as when the vehicle's brake light circuit has been engaged. When the RF signal is lost, all light generating elements are illuminated at high intensity to notify a trailing vehicle that the motorcycle brakes have been applied.

When the switch 34 is in the second operating mode or position 40, all light generating elements 32 are off until the RF signal from the transmitter module 16 is lost. Once the transmitter signal has been lost, all of the light generating elements are illuminated at high intensity to notify a trailing vehicle that the motorcycle brakes have been applied.

The above-described first and second operating modes provide a fail-safe feature whereby loss of the transmission signal due to reasons other than application of the vehicle's brakes, such as malfunction of the transmitter, will cause all of the light generating elements 32 to be illuminated at high intensity. This feature is advantageous over prior art solutions that transmit a signal only when the brakes are applied, since transmitter failure of the prior art will prevent the helmet-mounted lights from being illuminated.

Although a three-position slide switch is preferred, it is understood that other types of switches, such as toggle switches, push-button switches, membrane switches, and so on, can alternatively be used. In addition, it will be appreciated that more or less switch positions for selecting between more or less operating modes can be provided. By way of example, with only one operating mode, a single push-button or membrane switch can offer two selections between the "off" position 36 and either the first operating mode 38 or the second operating mode 40.

As shown in FIG. 3, an indicator 50 for remotely viewing operation of the receiver module 18 is illustrated. Preferably, the indicator 50 comprises a plastic optic fiber (POF) that has a first end 54 (shown in hidden line) located adjacent to the side of one of the light generating elements 32 (or an additional low intensity LED positioned for and dedicated to the POF illumination) and a second end 56 positioned at a location toward a front 52 of the safety helmet 12 for peripherally and/or subliminally viewing by the helmet wearer. When the receiver module 18 is in either the first or second operating modes, the second end 56 of the POF will be illuminated when the light generating element 32 is illuminated. Accordingly, the helmet wearer can verify correct operation of the receiving and transmitting modules, as well as other conditions such as inadvertently engaging the motorcycle's brake light circuit. The POF is preferably connected to the receiver module 18, but may additionally or alternatively be connected to the safety helmet 12.

Although a POF is preferred as the indicator, it will be appreciated that other indicator means can be used, such as a low intensity LED positioned at the front 52 of the safety helmet 12 and wires extending from the LED to the receiver module 18 for illuminating the LED upon illumination of one or more of the light generating elements 32. The LED brightness and position can be adjusted so that vision is not affected by the LED while wearing the helmet. According to a further embodiment of the invention, the POF or LED can be accompanied or replaced by an audio device, such as a piezoelectric buzzer, bell, voice annunciator, and so on.

Figure 4:
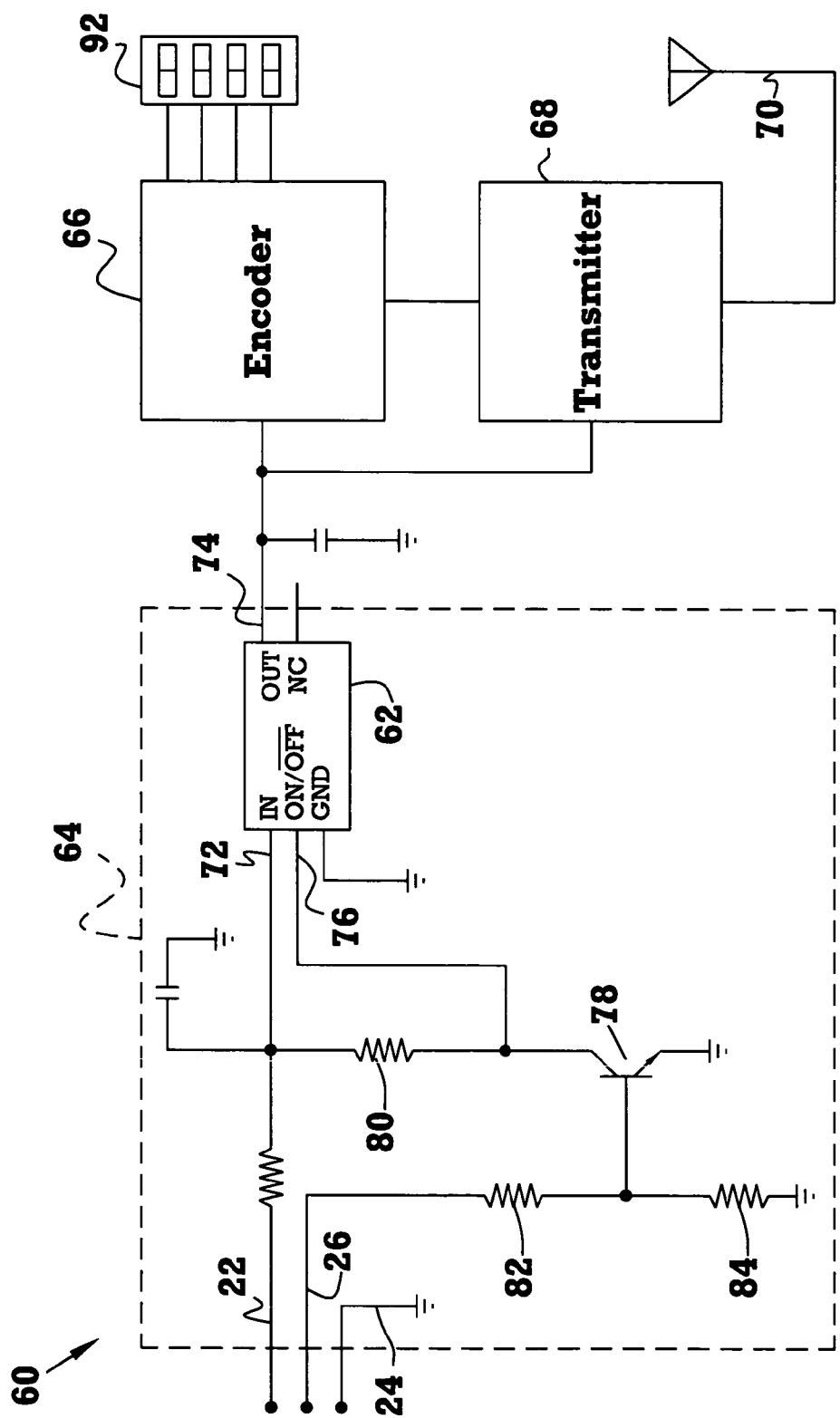
FIG. 4 is an electrical schematic of the transmitter module.

Referring now to FIG. 4, an electrical schematic 60 of the transmitter module 16 (FIG. 2) is illustrated. The electrical schematic 60 comprises a brake actuating sensor 64 connected to the power wire 22 and signal wire 26, a digital encoder 66 connected to the brake actuating sensor 64, a transmitter 68 connected to the brake actuating sensor 64 and encoder 66, and an antenna 70 connected to the transmitter 68.

The brake actuating sensor 64 preferably comprises a switching device in the form of a low drop-out voltage regulator 62 with a voltage input 72, a regulated voltage output 74, and a signal input 76 that switches the regulator 62 between operational and non-operational modes depending on the voltage level at the signal input 76. With the regulator in the operational mode, regulated voltage is delivered to the digital encoder 66 and transmitter 68 to continuously transmit an encoded RF signal to the receiver module 18. Conversely, with the regulator in the non-operational mode, no voltage is delivered to either the encoder 66 or the transmitter 68, to thereby prevent transmission of the encoded RF signal. A suitable low-dropout voltage regulator is provided by National Semiconductor under part #LP2980IM5-X5.0.

The brake actuating sensor 64 further comprises a transistor 78, a first resistor 80 connected between the vehicle's power supply via the power wire 22 and collector of the transistor 78, a second resistor 82 connected between the vehicle's brake light circuit via the signal wire 26 and the base of the transistor 78, and a third resistor 84 connected between the transistor base and the vehicle's ground via the ground wire 24.

In operation, when the vehicle's power is turned on, and before the vehicle's brake is engaged, the voltage at the signal input 76 is normally high. Consequently, the regulator is normally in the operational mode to thereby deliver regulated power to the encoder 66 and transmitter 68 such that an encoded signal is continuously transmitted to the receiver module 18. When the vehicle's brake pedal is depressed, a brake light signal is sent to the vehicle's rear brake and also to the base of the transistor 78 via the second resistor 82 to turn on the transistor. The second and third resistors 82, 84 function as a voltage divider to set the particular switching point of the transistor 78. Consequently, the voltage at the signal input 76 of the voltage regulator 62 is pulled low to thereby place the regulator in the non-operational mode and prevent signal transmission to the receiver module 18.

It will be appreciated that other types of switching devices or configurations may be used, and may be positioned before or after the encoder or transmitter.

The encoder 66 includes a four-position DIP switch 92 for manually setting a unique transmission code that will be recognized by the receiver module in a well-known manner. The DIP switch 92 prevents activation of the receiver module from spurious transmission signals or transmissions from other units or devices, and thus unwanted operation of the receiver module 18.

Figure 5:
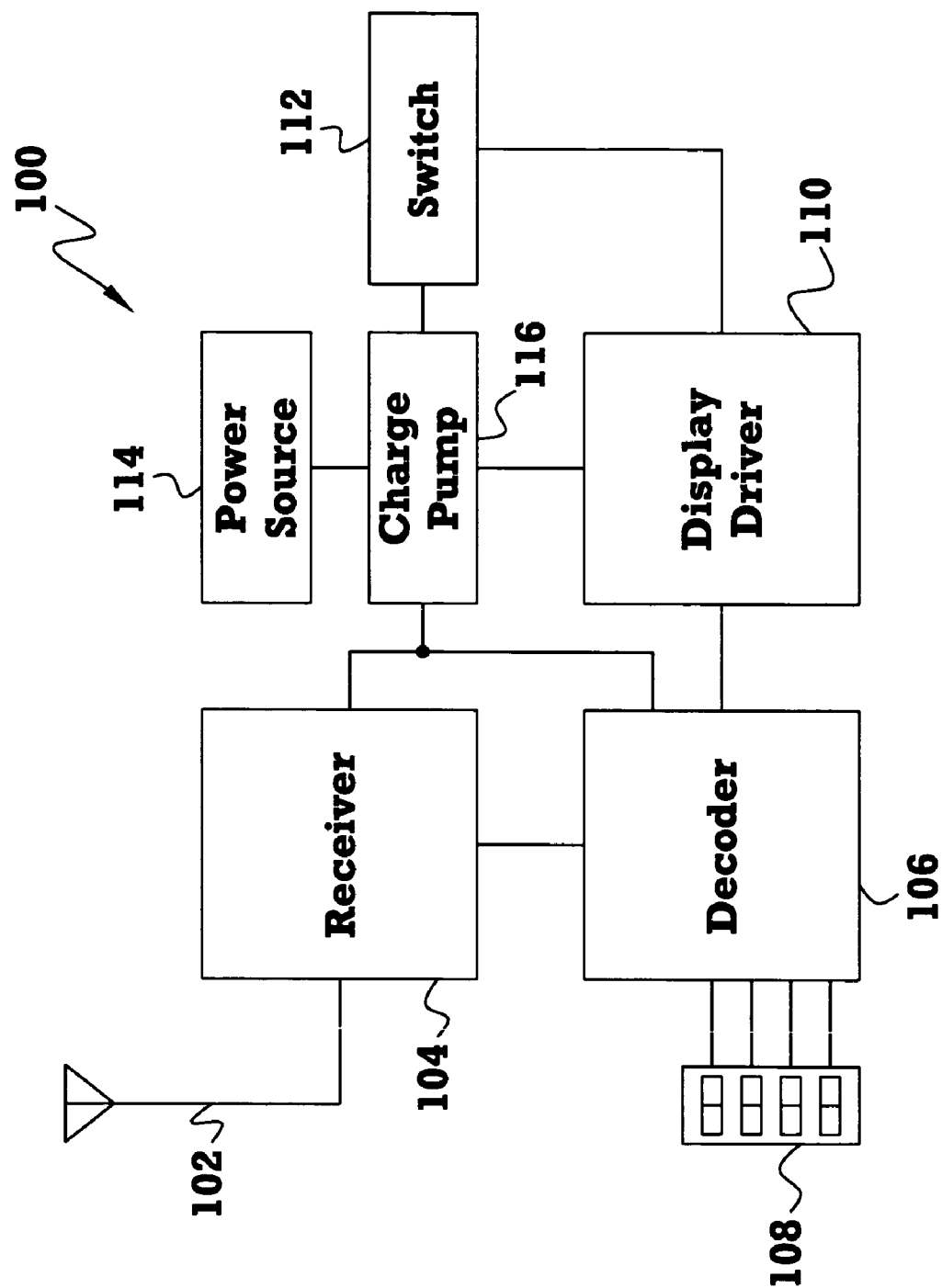
FIG. 5 is an electrical schematic of the receiver module.

Referring now to FIG. 5, an electrical schematic 100 of the receiver module 18 is illustrated. The receiver module includes an antenna 102, a receiver 104 connected to the antenna 102, a decoder 106 with a four-position DIP switch 108 connected to the receiver 104, a display driver 110 connected to the decoder 106, and a selection switch 112 connected to the display driver 110. A power source 114, such as the receiver 104, decoder 106, display driver 110, and switch 112. The charge pump 116 serves to boost the DC battery output from approximately 1 volt or more to approximately 5 volts so that one or more batteries with less than 5 volts output can be used as the power source.

The display driver 110 may include circuitry to drive the light emitting devices based on the position of the switch 112 and the presence or absence of the transmitted signal from the receiver 104 and decoder 106. The receiver/decoder pair thus function as a switch to either illuminate, increase the intensity, or extinguish one or more of the light emitting devices, depending on the selected mode of operation.

The four-position DIP switch 108 of the receiver module 118 is set to the same configuration as the four-position DIP switch 92 of the transmitter module 16 so that the receiver module 18 recognizes and responds to the encoded RF signal from the transmitter module. It will be understood that DIP switches for both the transmitter and receiver modules may have more or less switches, depending on the degree of desired transmission security.

The transmitter 68 and receiver 104 together with their associated encoder and decoder, can comprise well-known garage door transmitter/receiver pairs or the like and therefore will not be further described.

In accordance with a further embodiment of the invention, one or more of the DIP switches may be eliminated and the encoder and/or decoder may have factory the invention, the four-position DIP switch 108 of the receiver module 18 can be eliminated and each receiver module be programmed to learn the code of the transmitter module 16. By way of example, a momentary push-button switch (not shown) associated with the receiver module may be depressed for a predetermined period of time, such as five seconds, to enter a learning mode. One or more of the light generating elements may be flashed or otherwise illuminated to indicate that the learning mode has been initiated. The transmitter module can then be put into operation, such as by engaging the vehicle ignition without operating the brake lights. The receiver module will then receive the transmitted code and store it to memory, where it can be read and verified upon subsequent received transmissions. Once the transmitter code has been received, the receiver module may automatically return to the normal operating state, and the light emitting elements may be turned off or on, depending on the selected operating mode as described above. A plurality of receiver modules may be programmed in a similar way.

It will be appreciated by those skilled in the art that changes could be made to the embodiments described above without departing from the broad inventive concept thereof. By way of example, although the above-described embodiments have been described for use with a motorcycle, the instant invention may be used with other motorized vehicles where safety helmets may be desirable or required, including scooters, mopeds, all terrain vehicles, snowmobiles, bicycles, and other commercial and sport vehicles. For motorless vehicles or vehicles without their own power supply, such as bicycles, the transmitter module may be provided with its own battery power supply and the brake actuating sensor may be in the form of a limit switch, proximity switch, optical switch, or the like, that is placed adjacent a brake lever such that when the brake lever is pressed, the switch closes (or opens) to deactivate the transmitter and activate the warning light.

Moreover, although the transmitter and receiver modules have been described as RF transmitters, it is understood that other well-known means for wirelessly transmitting and receiving control signals can be used, such as infrared, UHF, and so on.

In addition, although the receiver module 18 and indicator 50 may be constructed separately and mounted to the helmet, it is understood that these components may be incorporated into the helmet structure to form a unitary safety device.

It is understood, therefore, that this invention is not limited to the particular embodiments disclosed, but it is intended to cover modifications within the spirit and scope of the present invention as defined by the appended claims.

We claim:

1. A brake light warning system comprising:
    a transmitter module adapted for mounting to a vehicle, the transmitter module being configured to continuously transmit a transmission signal when a brake of the vehicle is disengaged and discontinue transmission of the transmission signal when the vehicle brake is engaged;
    a receiver module adapted for mounting at a location spaced from the transmitter module, the receiver module being configured to detect a presence or absence of the transmission signal from the transmitter module, the receiver module including at least one light generating element that illuminates or increases in brightness upon detection of the absence of the transmission signal to thereby indicate that the vehicle brake is engaged.

2. A brake light warning system according to claim 1, wherein the transmitter module is electrically connectable to a brake light circuit of the vehicle.

3. A brake light warning system according to claim 2, wherein the transmitter module comprises:
   a brake actuating sensor; and
   a transmitter connected to the brake actuating sensor for continuously transmitting the transmission signal to the receiver module, the brake actuating sensor being configured to stop transmission of the transmission signal when a brake light signal is generated by the vehicle brake light circuit.

4. A brake light warning system according to claim 3, wherein the brake actuating sensor comprises a switching device electrically connectable to the brake light circuit.

5. A brake light warning system according to claim 4 wherein the switching device comprises a low voltage dropout regulator.

6. A brake light warning system according to claim 5, wherein the regulator comprises a first input for connection with a vehicle power supply, a second input operably connectable to the vehicle brake light circuit, and an output for delivering a regulated voltage to the transmitter, the presence or absence of the regulated voltage at the output being dependent on the presence or absence of a high voltage signal at the second input.

7. A brake light warning system according to claim 6, wherein the brake actuating sensor further comprises a transistor having a collector connected to the second input and adapted for connection to the vehicle power supply, an emitter adapted for connection to a vehicle ground, and a base adapted for connection to the vehicle brake light circuit, wherein a high voltage at the base of the transistor pulls the second input low to thereby place the regulator in a non-operational mode and prevent signal transmission to the receiver module.

8. A brake light warning system according to claim 1, and further comprising an indicator operably connected to the receiver module for remotely viewing operation of the at least one light emitting element.

9. A brake light warning system according to claim 8, wherein the indicator comprises a fiber optic with a first end positioned adjacent the at least one light emitting element and a second end positioned remotely from the first end, the second end of the fiber optic being illuminated when the light generating element is illuminated to thereby verify correct operation of the receiver and transmitter modules.

10. A brake light warning system according to claim 1, wherein the receiver module is configured to turn off or decrease in brightness the at least one light generating element upon detection of the absence of the transmission signal.

11. A brake light warning system for safety helmets, the warning system comprising:
   a transmitter module adapted for mounting to a vehicle, the transmitter module being configured to detect a vehicle brake state; the transmitter module being configured to continuously transmit a transmission signal when a brake of the vehicle is disengaged and discontinue transmission of the transmission signal when the vehicle brake is engaged;
   a receiver module adapted for mounting to a safety helmet, the receiver module being configured to detect a presence or absence of the transmission signal from the transmitter module, the receiver module including at least one light generating element that illuminates or increases in brightness upon detection of the absence of the transmission signal to thereby indicate that the vehicle brake is engaged; and
   an indicator operably connected to the receiver module for remotely viewing operation of the at least one light emitting element by a wearer of the safety helmet.

12. A brake light warning system according to claim 11, wherein the indicator comprises a fiber optic with a first end positioned adjacent the at least one light emitting element and a second end positioned remotely from the first end, the second end of the fiber optic being illuminated when the light generating element is illuminated to thereby verify correct operation of the receiver and transmitter modules.

13. A brake light warning system according to claim 12, wherein the transmitter module is configured to continuously transmit a transmission signal when a brake of the vehicle is disengaged and stop transmission of the transmission signal when the vehicle brake is engaged, and the receiver module is configured to detect a presence or absence of the transmission signal from the transmitter module and illuminate or increase in brightness the at least one light emitting element when the transmission signal is absent.

14. A method of operating an auxiliary safety brake light for a vehicle, the method comprising:
   monitoring whether a vehicle's brake is engaged or disengaged;
   continuously transmitting a signal when the brake is disengaged;
   discontinuing signal transmission when the brake is engaged;
   detecting a presence or absence of the signal; and
   modifying a state of an auxiliary safety brake light when the transmitted signal is not present to thereby indicate that the brake is engaged.

15. A method according to claim 14, wherein the step of modifying the state of the auxiliary safety brake light comprises illuminating the safety brake light.

16. A method according to claim 14, wherein the step of modifying the state of the auxiliary safety brake light comprises increasing a brightness of the safety brake light.

17. A method according to claim 14, and further comprising remotely monitoring the state of the safety brake light.

18. A method according to claim 14, wherein the step of continuously transmitting a signal comprises transmitting an encoded signal.

19. A method according to claim 14, wherein the steps of continuously transmitting a signal and detecting a presence or absence of the signal are performed wirelessly.

20. A method according to claim 19, and further comprising mounting the auxiliary safety brake light to a safety helmet.

* * * * *

UNITED STATES PATENT AND TRADEMARK OFFICE
CERTIFICATE OF CORRECTION

PATENT NO.       : 7,109,857 B2
APPLICATION NO.  : 10/891909
DATED            : September 19, 2006
INVENTOR(S)      : Ross, Jr. et al.

Page 1 of 1

It is certified that error appears in the above-identified patent and that said Letters Patent is hereby corrected as shown below:

Col. 5, line 42, insert: --a battery, is preferably connected to a charge pump 116, which is in turn connected to-- between "as" and 'the";

Col. 6, line 1, insert: --preset stationary or rolling code values. In accordance with yet a further embodiment of-- between "factory" and "the".

Signed and Sealed this

Fifth Day of December, 2006

JON W. DUDAS
*Director of the United States Patent and Trademark Office*